Sept. 1, 1964  HIDEO TATIBANA  3,146,807
BOTTLE FILLING APPARATUS
Filed Sept. 11, 1961  2 Sheets-Sheet 1
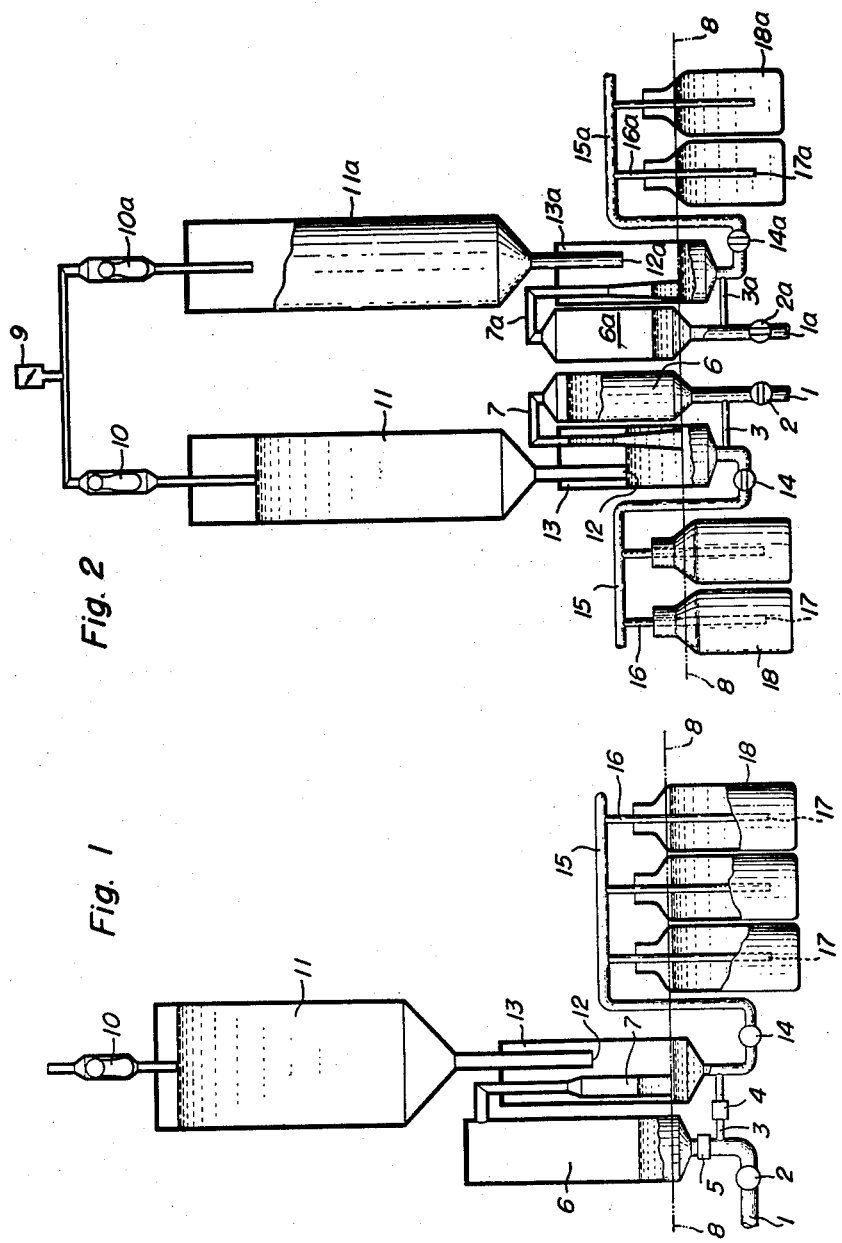

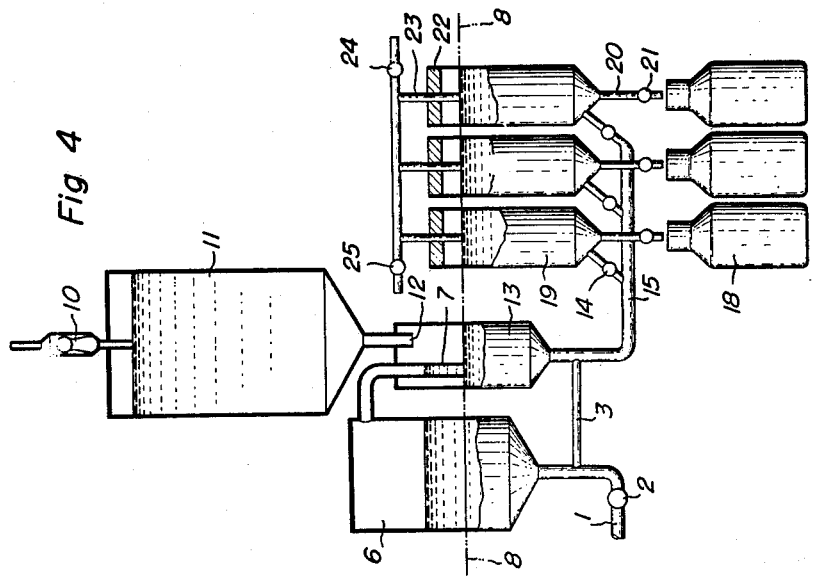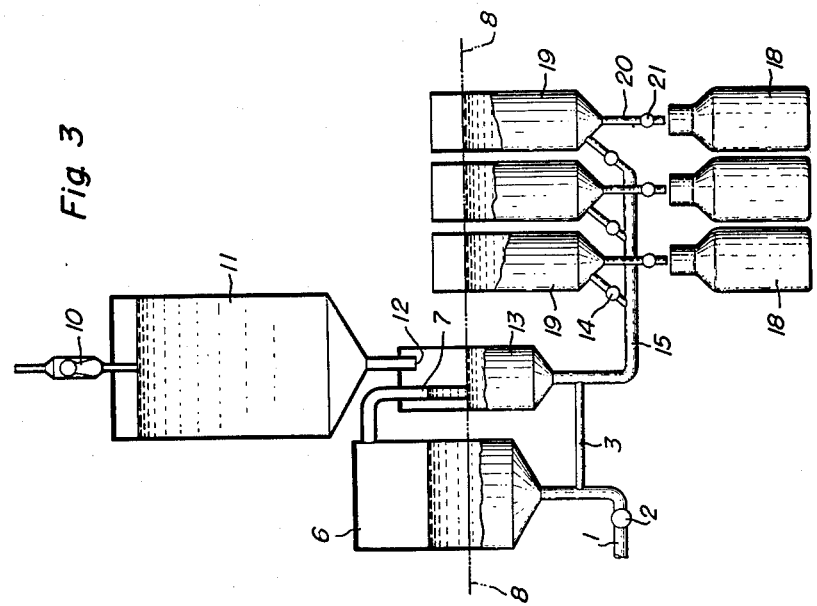

United States Patent Office 3,146,807
Patented Sept. 1, 1964

3,146,807
BOTTLE FILLING APPARATUS
Hideo Tatibana, 23 Showadori-2-chome, Nakano-ku,
Tokyo, Japan
Filed Sept. 11, 1961, Ser. No. 137,253
Claims priority, application, Japan,
Nov. 24, 1960, 35/46,596
4 Claims. (Cl. 141—230)

The present invention relates to bottle filling apparatus and has for an object to provide apparatus adapted to fill any desired number of bottles with liquid automatically and simultaneously to a predetermined level.

Another object of the invention is to provide apparatus having two alternately operable component sections each adapted to simultaneously fill any desired number of bottles with liquid to a predetermined level at high speed and with accuracy.

A further object of the present invention is to provide apparatus which is adapted to fill any desired number of bottles automatically and simultaneously each with a predetermined volume of liquid.

A still further object of the present invention is to provide apparatus adapted to fill a desired number of bottles each with a predetermined amount of liquid at a controlled rapid filling rate and with accuracy.

According to the present invention there is provided apparatus for automatically filling bottles with liquid to a predetermined level which comprises a liquid supply source, a dispensing tank disposed uppermost in the apparatus, a fluid supply line having a stop valve and for supplying said dispensing tank with fluid under gravity or pumping pressure, a supplemental vessel connected at the bottom with said fluid supply line, a levelling vessel connected by a connecting pipe with said supply line, said connecting pipe being arranged so that the fluid level in the levelling vessel may rise at a rate lower than in the supplemental vessel, a levelling pipe depending from the top of said supplemental vessel and opening at said predetermined level in said levelling vessel adjacent the bottom thereof, a float valve provided in the dispensing tank at the top thereof, said dispensing tank opening at the bottom in the levelling vessel slightly above said predetermined level, a manifold having a stop valve and connected to the bottom of said levelling vessel, a plurality of filling tubes adapted to be inserted into the respective bottles and each connected at the top with said manifold above said predetermined level and opening at the bottom in said respective bottle below said predetermined level, the arrangement being such that the total amount of fluid which may be held above said predetermined level in said dispensing tank and said levelling vessel is slightly short to fill all of said bottles to said predetermined level but that said supplemental vessel is adapted to hold the fluid in an amount slightly more than sufficient to cover the shortage.

According also to the present invention, there is provided a combination of two bottle filling apparatus which are alternately operable with the float valves in said respective apparatus interconnected at the top with each other by a connecting pipe incorporating an automatic stop valve, said stop valve being adapted to close communication with the atmosphere as the air pressure in said connecting pipe exceeds a predetermined value and open as the pressure falls below said predetermined value.

According also to the present invention, there is provided an apparatus for filling bottles each with a predetermined volume of fluid which comprises a dispensing tank disposed uppermost in the apparatus, a fluid supply line having a stop valve for supplying said dispensing tank with fluid under gravity or pumping pressure, a supplemental vessel connected at the bottom with said fluid supply line, a levelling vessel connected by a connecting pipe with said supply line, said connecting pipe being arranged so that the fluid level in said levelling vessel may rise at a rate lower than in said supplemental vessel, a levelling pipe depending from the top of said supplemental vessel and opening at a predetermined level in said levelling vessel adjacent the bottom thereof, a float valve provided in said dispensing tank at the top thereof, said dispensing tank opening at the bottom in said levelling vessel slightly above said predetermined level, a manifold extending from the bottom of said levelling vessel, a plurality of measuring vessels connected at the bottom with said manifold by way of respective stop valves, and outlet tubes depending from the respective measuring vessels and each having a stop valve, said measuring vessels each being dimensioned so as to hold said predetermined volume of the fluid between said predetermined level and the level of said stop valve.

According also to the present invention, there is provided an apparatus for filling bottles each with a predetermined volume of fluid comprising a dispensing tank disposed uppermost in the apparatus, a fluid supply line having a stop valve for supplying said dispensing tank with fluid under gravity or pumping pressure, a supplemental vessel connected at the bottom with said fluid supply line, a levelling vessel connected by a connecting pipe with said supply line, said connecting pipe being arranged so that the fluid level in said levelling vessel may rise at a rate lower than in said supplemental vessel, a levelling pipe depending from the top of said supplemental vessel and opening at a predetermined level in said levelling vessel adjacent the bottom thereof, a float valve provided in said dispensing tank at the top thereof, said dispensing tank opening at the bottom in said levelling vessel slightly above said predetermined level, a manifold from the bottom of said levelling vessel, a plurality of measuring vessels connected at the bottom with said manifold by way of respective stop valves, outlet tubes depending from the respective measuring vessels and each having a stop valve, said measuring vessels each being dimensioned so as to hold said predetermined volume of the fluid between said predetermined level and the level of said stop valve, stoppers for sealingly closing said respective measuring vessels at the top thereof, thin tubes extending vertically through said respective stoppers and opening at the bottom in said respective measuring vessels at said predetermined level, an air blast pipe connected by way of a stop valve with said thin tubes and a vent pipe connected by way of another stop valve with said thin tubes.

The above and other objects, features and advantages of the present invention will become apparent from the following description when read in connection with the accompanying drawings, which illustrate several embodiments of the invention.

In the drawings:

FIG. 1 is a diagrammatic elevation view of one preferred embodiment of the invention adapted to fill any desired number of bottles with liquid simultaneously to a predetermined level;

FIG. 2 is a diagrammatic elevation view of another embodiment of the invention comprising a pair of alternately operable bottle filling devices adapted to fill bottles to a predetermined level at high operational speed;

FIGS. 3 and 4 represent similar elevation views of further embodiments each adapted to fill any desired number of bottles simultaneously each with a predetermined volume of liquid.

Referring to the drawings, and particularly to FIG. 1, there is shown one embodiment of the invention which includes a dispensing tank 11 disposed uppermost in the apparatus. A supplemental vessel 6 is located below tank 11 and is furnished with a supply line 1 having a stop valve 2. The dispensing tank 11 is supplied through the line 1 from a storage tank not shown by the pressure head of fluid or pumping pressure. The supply line 1 is also connected to the bottom of a levelling vessel 13 by way of a connecting pipe 3 in a manner so that the level in the vessel 13 may rise at a rate lower than in the supplemental vessel 6. To this end, the pipe 3 may be reduced in diameter at a point or at points intermediate the ends or the pipe 3 may be increased in length, or bent to change the flow direction thereby to reduce the flow rate. Moreover, the pipe 3 may be equipped with a control valve 4 as shown.

Depending from the top of the supplemental vessel 6 is a leveling pipe 7 the bottom end of which opens at a predetermined level 8 in the bottom portion of the levelling vessel 13.

A float valve 10 is provided at the top end of the dispensing tank 11, the tank opening at the bottom end at a level slightly higher than said predetermined level 8 within the levelling vessel 13 as shown.

Connected to the bottom of the levelling vessel 13 is a manifold 15 having a stop valve 14. Depending from the manifold 15 at spaced-apart locations are a suitable number of filling tubes 16 which are connected at the top end with the manifold 15 above said predetermined level 8 and open at the bottom end 17 below such level 8. These filling tubes 16 are inserted in a corresponding number of bottles 18, as shown.

The above component members including dispensing tank 11, fixed levelling vessel 13 and supplemental vessel 6 are dimensioned so that the total amount of liquid which may be held above said predetermined level 8 in the dispensing tank 11 and the levelling vessel 13 is slightly short of the total amount of liquid to be filled in the group of bottles 18 but that the supplemental vessel 6 is dimensioned to contain the liquid in an amount slightly more than sufficient to cover the shortage.

FIG. 2 illustrates a second embodiment which includes a pair of alternately operable filling sections each of which corresponds to the apparatus described above with reference to FIG. 1. In FIG. 2, the corresponding parts of the two filling sections are designated by like reference numerals with a suffix *a* attached to the numerals for the right-hand section as viewed in FIG. 2.

The float valves 10–10a are interconnected at the top by a connecting pipe which has arranged therein an automatic stop valve 9 operable to close as the air pressure in the connecting pipe exceeds a predetermined value and to open as it falls below such value.

A further embodiment of the invention shown in FIG. 3 is generally similar to that shown in FIG. 1 except that the manifold 15 connected to the bottom of the levelling vessel 13 is connected with a suitable number of measuring vessels 19 at the bottom thereof by way of respective stop valves 14. The measuring vessels 19 each have an outlet tube 20 depending from the bottom thereof with an associated stop valve 21. The measuring vessels 19 are each dimensioned so as to hold a predetermined volume of liquid between the predetermined level 8 and the level of the stop valve 21. The outlet tubes 20 are disposed to open above the respective bottles 18, as shown.

FIG. 4 illustrates a further modified form of the filling apparatus, which is generally similar to the embodiment shown in FIG. 3 except that the measuring vessels 19 are each sealingly closed at the top by a stopper 22 through which a thin tube 23 extends. The thin tube 23 opens at the bottom at the predetermined level 8 and is connected at the top with an air blast pipe by way of a stop valve 24 and with a vent pipe by way of a stop valve 25.

In order that the liquid in operation may more rapidly flow into the supplemental vessel 6 as compared to leveling vessel 13 and reach a level in vessel 6 which is higher than that sufficient for full supplementation in accordance with the viscosity of the liquid to be filled and the filling volume of the liquid for each bottle, the connecting pipe 3 may be constricted midway or lengthened or bent to reduce the rate of flow therethrough or may be equipped with a control valve 4 as described hereinbefore. Alternatively, however, a control valve 5 may be arranged at the junction of the supply line 1 with the bottom of the supplemental vessel 6 to render the flow control more easy and dependable.

In operation of the apparatus of the single system as shown in FIG. 1, the stop valves 14 and 2 are first manually or mechanically closed and opened, respectively, to allow the liquid in the storage tank (not shown) to flow through the supply line 1 under the pressure head of the fluid or pumping pressure and rapidly enter the supplemental vessel 6 while also entering the levelling vessel 13 to rise therein relatively slowly. Initially, the air in the top space of the supplemental vessel 6 of course escapes freely through the levelling pipe 7. This air escapement continues, however, even after the slowly rising level in the leveling vessel 13 has reached the bottom end of the pipe 7, in the form of air bubbles bursting violently until the liquid level within the levelling vessel 13 has risen substantially above the bottom of the levelling pipe 7 confining the air therein to cease bubbling. At this time, the supplemental vessel 6 contains fluid to a level therein above said predetermined level, the fluid being present in an amount which is more than sufficient to meet the purpose of fluid supplementation as shall be shown hereinafter.

On the other hand, the liquid which has risen within the levelling vessel 13 to the bottom opening 12 of the dispensing tank 11 continues to rise now substantially exclusively into the dispensing tank 11 until it reaches the float valve 10 open to the atmosphere at the top thereof, at which time the liquid rise stops. Simultaneously, the pressure within the tank 11 is suddenly increased to the fluid supply pressure. As a consequence, the enclosed air in both the levelling pipe 7 and the top space of supplemental vessel 6 is compressed under the same increased pressure, the supplemental vessel 6 and the levelling pipe 7 together forming a sort of U-tube with the liquid masses in the respective bottom portions in communication with each other via pipe 3. Thus, the liquid in the levelling pipe 7 is pushed up while the liquid level within the supplemental vessel 6 is more or less lowered until the liquid in the levelling pipe 7 is balanced with the same level set in both the pipe 7 and the vessel 6.

The stop valve 2 is then closed and the valve 14 opened, to allow the mass of liquid in the dispensing tank 11 to flow through the manifold 15 into the multitude of bottles 18.

As the liquid level drops within the dispensing tank 11, the pressure of air enclosed in the top space of the levelling and supplemental vessels 13 and 6, respectively, is alleviated to allow the air to more or less expand to return to its original state. As a result, the liquid which has risen into the levelling pipe 7 flows down back into the levelling vessel 13 while at the same time the level in the supplemental vessel 6 drops more or less back to the original height by the flow of liquid through pipe 3. It will be understood that the supplemental vessel 6 contains liquid to a level above the predetermined level 8 in an amount sufficient to effect required adjustment.

The liquid levels in the bottles 18, which are being filled through the filling tubes 16 extending downwardly from the manifold 15 into the respective bottles 18, continue to rise at more or less irregular rates until the levels reach the bottom openings 17 of respective filling tubes 16, when the liquid masses in the bottles 18 are placed siphonically in communication with each other and gradually reach the same level.

However, the total amount of liquid which may be filled in this manner is insufficient to fill all the bottles 18 up to the predetermined level 8. Accordingly, there will be no overflowing of the liquid from the bottle and the liquid level in the levelling vessel 13 siphonically connected with the bottles is thus far below the bottom opening of the levelling tube 7, allowing air to be drawn via opened valve 10 through the bottom opening of the tube 7 into the supplemental vessel 6, which maintains a relatively high liquid level within. This causes a flow of liquid from the bottom of the supplemental vessel 6 to the bottles 18 to raise the respective levels therein. Such filling action is automatically repeated until the levels in all the bottles 18 reach the predetermined level 8, the liquid in the levelling vessel 13 retaining the same level as in the bottles and just closing the bottom of the leveling pipe 7.

Then, the stop valve 14 is again closed and the stop valve 2 opened to again feed liquid to the dispensing tank 11, while the filled bottles 18 are replaced by the same number of empty bottles and the above filling operation is repeated.

It will be appreciated from the foregoing that the apparatus according to the present invention may be operated to repeat its operation of simultaneously filling an array of individual vertically set bottles with liquid automatically and accurately to a predetermined level.

In operation of the equipment comprising a pair of filling sections as shown in FIG. 2, first the stop valve 14 is closed and the stop valve 2 opened to allow the fluid in the storage tank (not shown) to flow into the dispensing tank 11 until the level therein reaches the float valve 10 at the top thereof, after filling the supplemental vessel 6 to above the predetermined level 8 more than sufficient for the purpose of supplementation.

After the liquid in the system has come to rest, the stop valve 2 is closed and the stop valve 14 is opened while the stop valve 14a is closed and the stop valve 2a is opened. Liquid starts to flow from vessel 13 to vessels 18 through manifold 15. Simultaneously the liquid starts to flow under the pressure head of the fluid or pumping pressure firstly into the supplemental vessel 6a until the latter is filled to above the required level 8 with the liquid in an amount more than sufficient for supplementation and then the liquid gradually rises into the dispensing tank 11a, forcing air therein through the float valve 10a at the top thereof into the connecting pipe to raise the air pressure therein at a rate corresponding to that of the liquid rise in the tank 11a until the automatic stop valve 9 is closed to the atmosphere and thus the float valve 10 at the top of the opposite dispensing tank 11 is under pressure and is opened without delay and with certainty. The measured quantity of liquid stored in the dispensing tank 11 is pushed down and together with the liquid in the levelling vessel 13 directly below the tank 11 rapidly flows through the manifold 15 simultaneously to enter the desired number of bottles 18. The liquid levels in the bottles 18, which are being filled through the filling tubes 16 depending from the manifold 15 into the respective bottles 18, continue to rise at more or less irregular rates until each of the levels reaches the bottom openings 17 of the respective filling tube 16, when the liquid masses in the bottles 18 are siphonically placed in communication with each other and soon rise to the same level, as described above in connection with FIG. 1.

However, the total amount of liquid which may be filled in this fashion is insufficient to fill all the bottles 18 to the predetermined level 8. Accordingly, the liquid level in the vessel 13 siphonically connected with the bottles is thus below the bottom opening of the levelling tube 7, allowing air to be drawn through the bottom opening of the tube 7 into the supplemental vessel 6 having a relatively high liquid level therein. In accordance with the air flow, liquid in the supplemental vessel 6 is caused to flow through the bottom thereof to the bottles 18 to raise the respective levels therein. Such filling action is automatically repeated and in the meantime the air pressure in the connecting pipe decreases to open the automatic stop valve 9 to restore normal air pressure in the system. As a result, the liquid in each of the bottles 18 attains the predetermined level 8, the liquid in the levelling vessel 13 being at the same level as that in the bottles and closing the bottom opening of the levelling pipe 7, the entire liquid system thus coming to rest.

Then, the operator closes the stop valve 14 and opens the stop valve 2, closes the stop valve 2a and opens the stop valve 14a while replacing the group of the filled bottles 18 by a separately prepared group of new bottles to repeat the above filling operation.

It will be appreciated from the above description that the apparatus of the present invention may include a pair of filling sections of identical construction which are alternately operable to continuously repeat an operation of filling any desired number of bottles simultaneously and rapidly to a predetermined level.

In the embodiment shown in FIG. 3 the manifold 15 as described above is connected to the bottom of the levelling vessel 13 and is connected to a suitable number of measuring vessels 19 at the bottom thereof by way of respective stop valves 14. The measuring vessels 19 each have an outlet tube 20 depending from the bottom thereof and have a stop valve 21. Each of the vessels 19 is accurately dimensioned so as to hold a predetermined volume of liquid between a predetermined level 8 and the level of stop valve 21. In operating the device, the operator first closes stop valves 14 and opens to stop valve 2 to allow the liquid in the storage tank (not shown) to flow under the pressure head of the fluid or pumping pressure firstly to enter the supplemental vessel 6 until the latter is filled with liquid in an amount more than sufficient for supplementation above the predetermined level 8, and thereafter to cause a rise of liquid into the dispensing tank 11 to the level of the float valve 10 at the top of tank 11. Next, the valve 2 is closed and the valves 14 are opened to allow the predetermined amount of liquid held in the dispensing tank 11, which is disposed above any of the other component members, to flow under gravity, together with the liquid in the levelling vessel 13 disposed directly below said tank, to enter the measuring vessels 19 through the manifold 15. The measuring vessels 19 are siphonically connected with each other, and the liquid masses in these vessels 19 will attain the same level while continuing to rise together with the supplement from the supplemental vessel 6 to reach the predetermined level 8, when the liquid in the system comes to rest with a predetermined volume of liquid held in each of the measuring vessels 19.

Then the stop valve 2 is opened and the valves 14 closed in order to fill the supplemental vessel 6 to above the predetermined level 8 with liquid in an amount more than sufficient for supplementation and further to fill the dispensing tank 11 afresh with a predetermined volume of liquid. The stop valves 21 are then opened to allow the bottles arranged directly below to be filled simultaneously with a measured volume of liquid.

It will readily be appreciated that the apparatus constructed and arranged according to the present invention has an advantage that it may repeatedly perform an operation of automatically and simultaneously filling any desired number of bottles each with a predetermined volume of liquid.

In operation of the embodiment shown in FIG. 4 in which as described above the measuring vessels 19 are each sealingly closed at the top by a stopper 22 through which extends a thin tube 23 opening at the bottom at the given level 8 and connected at the top with an air blast pipe by way of a stop valve 24 and with a vent pipe by way of a stop valve 25, firstly the stop valve 24 connected to the top of thin tubes 23 is closed and the stop valve 25 connected with the exhaust is opened to allow the predetermined volume of liquid held in the dispensing tank 11 to flow through the manifold 15 together with the liquid held in the levelling vessel 13 to enter the row of measuring vessels 19, which are thereby siphonically connected with each other. The liquid masses therein will attain substantially the same level continuing to rise together with the supplement from the supplementing vessel 6 finally to reach the predetermined level 8.

The time when the level 8 is attained inevitably varies among the measuring vessels 19. However, the level variation will be very limited by the fact that the liquid surface after it has reached the bottom opening of the thin tube 23 or the predetermined level 8 is slowed down owing to the frictional drag of the thin tube 23 so that the liquid surfaces in the measuring vessels are rapidly brought substantially to the predetermined level 8.

Then, the exhaust line stop valve 25 is closed and the valve 24 opened in order to supply air under pressure to the vessels 19 to force down the measured volumes of liquid in the measuring vessels 19 through the respective outlet tubes 20 simultaneously into the bottles 18 arranged directly below the respective outlet tubes under controlled blast pressure and hence at controlled filling rate.

It will thus be appreciated that according to a further feature of the present invention a desired number of bottles may rapidly and simultaneously be filled each with a predetermined volume of liquid at a desired rate and with accuracy.

In addition, it will be apparent from the foregoing description that the apparatus of the present invention may readily be modified to perform operations under sterile conditions.

It is extremely difficult to obtain at all times identical results with respect to the filling time and the fluid quantity in the same filling apparatus with liquids which tend to flow down at respective varying rates. The present invention overcomes such difficulty by arranging so that the fluid may at all times flow down substantially at a predetermined rate.

It will also be appreciated from the foregoing that the apparatus according to the present invention is extremely advantageous in that it may readily be adapted to suit any particular fluid to be handled in conformity with its specific gravity, viscosity, volatility, sedimentation and even with its inflammability and explosiveness.

What is claimed is:

1. Apparatus for automatically filling bottles to a predetermined level with fluid, said apparatus including at least one device comprising a dispensing tank disposed uppermost in the apparatus, a fluid supply line including a stop valve adapted for supplying said dispensing tank with fluid, a supplemental vessel connected at the bottom thereof with said fluid supply line, a levelling vessel, connecting pipe means connecting the levelling vessel with said supply line for causing the fluid level in the levelling vessel to rise at a slower rate than that in the supplemental vessel, a levelling pipe extending from the supplemental vessel at the top thereof into said levelling vessel and opening therein at said predetermined level, a float valve in the dispensing tank, said dispensing tank opening at the bottom thereof into the levelling vessel at a level above said predetermined level, a manifold connected to the bottom of said levelling vessel and including a stop valve, a plurality of filling tubes each adapted to be inserted into a respective bottle and connected to said manifold at a location above said predetermined level and opening into each respective bottle at a level below said predetermined level, said dispensing tank and levelling vessel having a total capacity to provide a total amount of fluid held above said predetermined level which is less than sufficient to fill all of said bottles to said predetermined level, said supplemental vessel having a capacity sufficient to hold a quantity of fluid in an amount in excess of the quantity of fluid necessary to complete the filling of the bottles to said predetermined level.

2. Apparatus as claimed in claim 1, comprising two of said devices alternately operable, and a connecting pipe including an automatic stop valve interconnecting each said device, said stop valve being operable to close as air pressure in said connecting pipe exceeds a predetermined value and open as the pressure falls below said predetermined value.

3. Apparatus for filling bottles each with a predetermined volume of fluid, the apparatus comprising a dispensing tank disposed uppermost in the apparatus, a fluid supply line including a stop valve adapted for supplying said dispensing tank with fluid, a supplemental vessel connected at the bottom thereof with said fluid supply line, a levelling vessel, connecting pipe means connecting the levelling vessel with said supply line for causing the fluid level in said levelling vessel to rise at a slower rate than that in said supplemental vessel, a levelling pipe extending from the supplemental vessel at the top thereof into said levelling vessel and opening therein at said predetermined level, a float valve in said dispensing tank, said dispensing tank opening at the bottom thereof into said levelling vessel at a level above said predetermined level, a manifold extending from the bottom of said levelling vessel, a plurality of measuring vessels connected to said manifold, stop valves controlling fluid flow between each of the measuring vessels and the manifold, and outlet tubes depending from the respective measuring vessels each including a stop valve, said measuring vessels each having a capacity to hold said predetermined volume of the fluid between said predetermined level and the level of the stop valve in the associated outlet tube.

4. Apparatus as claimed in claim 3 further comprising stoppers for sealingly closing said respective measuring vessels at the top thereof, tubes extending vertically through said respective stoppers and opening at the bottom in said respective measuring vesesls at said predetermined level, an air blast pipe including a stop valve connected to said tubes, and a vent pipe having a stop valve and connected to said tubes.

References Cited in the file of this patent
UNITED STATES PATENTS
430,526    Kinder et al. _____ June 17, 1890